United States Patent
Lee et al.

(10) Patent No.: US 7,386,483 B1
(45) Date of Patent: Jun. 10, 2008

(54) ELECTRONIC MARKETPLACE SYSTEM AND METHOD FOR SELLING WEB SERVICES

(75) Inventors: Wing K Lee, Overland Park, KS (US); Sei Y. Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 499 days.

(21) Appl. No.: 10/790,653

(22) Filed: Mar. 1, 2004

(51) Int. Cl.
*G06Q 30/00* (2006.01)
*G06F 17/30* (2006.01)

(52) U.S. Cl. .............................. 705/26; 705/27; 705/80

(58) Field of Classification Search ............ 705/26–27, 705/37, 1, 80
See application file for complete search history.

(56) References Cited

U.S. PATENT DOCUMENTS

| | | | |
|---|---|---|---|
| 2002/0035521 A1* | 3/2002 | Powers ......................... | 705/28 |
| 2002/0049608 A1* | 4/2002 | Hartsell et al. ................. | 705/1 |
| 2003/0110119 A1* | 6/2003 | Crites .......................... | 705/37 |
| 2003/0195813 A1* | 10/2003 | Pallister et al. ............... | 705/26 |
| 2003/0212587 A1* | 11/2003 | Jamison ......................... | 705/8 |
| 2003/0220880 A1* | 11/2003 | Lao et al. ...................... | 705/51 |
| 2004/0030627 A1* | 2/2004 | Sedukhin ...................... | 705/36 |
| 2004/0220910 A1* | 11/2004 | Zang et al. .................... | 707/3 |
| 2005/0091364 A1* | 4/2005 | Bantz et al. ................... | 709/224 |

OTHER PUBLICATIONS

"Get ready for low cost web services". Manufacturing Computers Solutions. May 2002. vol. 8, Iss 5; p. 4, 1pgs. [receovered from Proquest database Dec. 9, 2006].*
Aaron Skonnard, *The Birth of Web Services*, Oct. 2002. pp. 1-8, MSDN Magazine.

* cited by examiner

Primary Examiner—Matthew S. Gart
Assistant Examiner—William J. Allen

(57) ABSTRACT

A web services marketplace for providers to offer web services and customers to obtain the web services of the provider is provided. The web services marketplace includes an offering component identifying one or more web services provided by one or more web service provider, and a transaction component operable for the customer to obtain the web service offering from the provider. A method for selling web services based on a quality of service is further provided. The method includes providing an electronic marketplace system for selling web services, and offering, by a plurality of providers, web services via the electronic marketplace system based on a quality of service for the web service. The method also provides for obtaining, by one or more customers via the electronic marketplace system, the web services having the quality of service for the web service from one or more of the providers.

22 Claims, 1 Drawing Sheet

ELECTRONIC MARKETPLACE SYSTEM AND METHOD FOR SELLING WEB SERVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to the field of exchanging and auctioning web based services between customers and providers, and more specifically, but not by way of limitation to a web services market place for providers to offer web services and customers to obtain the web services of the provider based on a quality of service.

BACKGROUND OF THE INVENTION

With the expansion of the Internet and increase of access to the Internet, a wide variety of web based interfaces and systems have developed. These interfaces and systems often enhance the value and utility provided by an Internet web site or electronic information system or service. The success of an Internet web site, for example, may strongly depend on the quality of the utilities provided by the web site. In addition, the growth in the field of Internet web sites has demanded that competitive companies provide more than a single resource on their website.

As a consequence, many companies have continued to develop custom applications or services for their Internet web site. The requirements for maintaining a complex and specialized development process to support these services increase in relation to the availability of the features and services, as well as in relation to the complexity of the services. A small company may lack the resources to devote to such development work, while a large enterprise with multiple diverse computing systems, perhaps as a result of corporate mergers or acquisitions, may find the resources required prohibitive with regards to the number of websites or web services.

One avenue of development to deal with the demand for distributed applications that place the highest priority on interoperability has been with web services. In many ways, web services have evolved from past distributed component technologies like remote procedure calls (RPC), object-oriented remote procedure calls ORPC (DCOM, CORBA, Java RMI), and messaging services. The web services platform as evolved by the Web Services Interoperability Organization (WS-I) (see <http://www.ws-i.org>) defines a simple, interoperable, messaging framework upon which one can build more sophisticated designs, but which remains simpler and more uniform than pervious distributed component technologies. A web service includes, but is not limited to, a discrete function or set of functions which operate across the Internet and which perform in a uniform manner across the Internet, regardless of whether or not the service is compatible or complies with formal Web Services standard setting organizations.

As this disclosure focuses on the exchange of web services, a few brief examples of some of the possible services may serve to help illustrate the type of services being exchanged. For example, one web service may represent the ability to draw a map connecting a known location to one selected by a user of the web site which subscribes to or maintains the functionality of the web service. Such a service would have value to any business which desired to have its website operable to show any and all potential clients how to locate their offices. As a different example, another web service may provide current and constantly updated information and images related to a particular topic, including but not limited to such topics as traffic reports, business news, and weather.

SUMMARY OF THE INVENTION

The present disclosure provides a web services marketplace for providers to offer web services and customers to obtain the web services of the provider. The web services marketplace includes an offering component identifying one or more web services provided by one or more web service provider, and a transaction component operable for the customer to obtain the web service offering from the provider.

In one embodiment, the present disclosure provides a method for selling web services based on a quality of service. The method includes providing an electronic marketplace system for selling web services, and offering, by a plurality of providers, web services via the electronic marketplace system based on a quality of service for the web service. The method also provides for obtaining, by one or more customers via the electronic marketplace system, the web services having the quality of service for the web service from one or more of the providers.

In another embodiment, an auction system for auctioning web services is provided. The auction system includes a storage component operable to identify web services, and an auction component operable to auction one of the web services identified by the storage component, the auction component operable to adjust a price for the web service being auctioned based on responses from auction participants.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present system is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Since web services overcome many compatibility and interoperability issues, the problems inherent with providing new Internet related services, such as customized development and significant integration time and expense, are somewhat removed by web services. As such, web services may be marketed and provided in a more commodity-like fashion and less like a service, as has been the case for traditional computer software development and integration in the past. For this reason, web services lend themselves to a new platform for providing web services to businesses or users.

Figure 1:
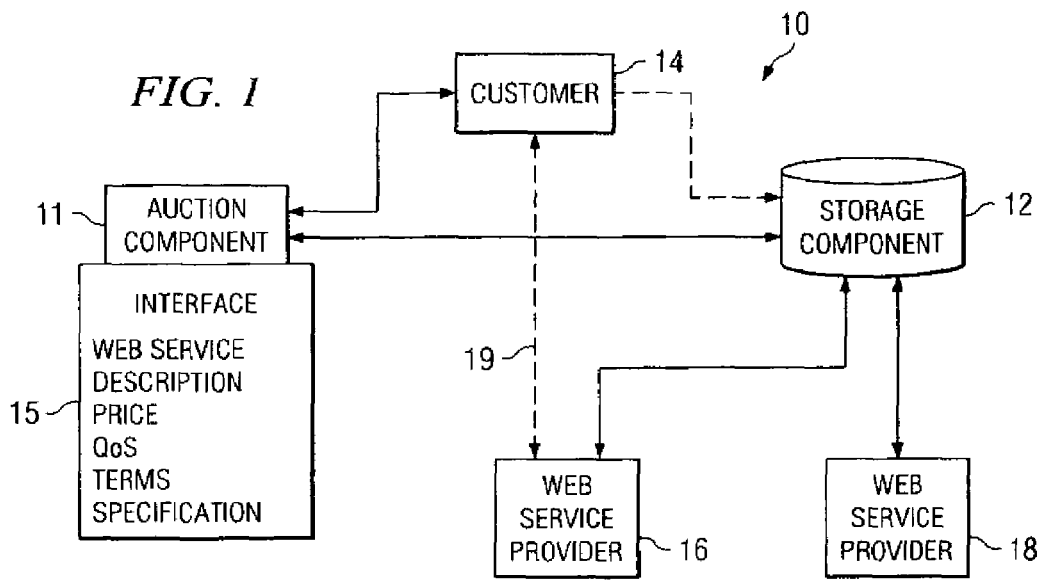
FIG. 1 is an embodiment of an electronic marketplace for providing web services.

FIG. 1 shows an embodiment of an electronic marketplace 10 for providing web services. The format of the electronic marketplace 10 may vary depending upon the particular web service being offered and related customer. In the present embodiment, the approach is an auction-type exchange, however, the present disclosure contemplates other formats as well, such as more traditional electronic catalog systems. In this alternative embodiment, the auction component 11 may be employed as, for example, a conventional online catalog where web services are listed and available for purchase by customers, unlike a request for proposal provided via the website of a business. The auction component 11, in this alternative, is operable for managing the financial transactions between the buyers and seller of the web services marketed via the electronic marketplace 10. The presently illustrated embodiment includes an auction component 11 that is operable for managing the auction functions and transactions for marketing web services. A customer 14 may access the auction component 11, using a web browser such as NETSCAPE from NETSCAPE COMMUNICATIONS CORPORATION, based in Mountain View, Calif. or such as INTERNET EXPLORER from MICROSOFT CORPORATION, based in Redmond, Wash. Other systems, such as a client application resident on the customer 14 computer may be used as well.

The auction component 11 may include an interface 15 operable to electronically receive and display the web services identified by a storage component 12 for offering. The interface 15 may be operable, via the storage component, to maintain substantial Information related to the web service, such as detailed descriptions, specifications, license agreements or other legal or contractual documents related to the purchase or use of the web services, and quality of service. When the customer 14 accesses the auction component 11, the auction component 11 accesses the storage component 12. The auction component 11 may accesses the storage component 12 by a number of systems including, but not limited to, a remote procedure call (RPC), a database query, and a message queuing service. The access may take place through an Internet connection using a standard protocol, such as, for example, through a socket connection using the transmission control protocol/Internet protocol (TCP/IP). In the present embodiment, the storage component 12 is associated with the auction system 11, however, the storage component 12 and information may reside or be obtained elsewhere.

The storage component 12 provides the web services available for auction to the auction component 11 at the time the customer 14 accesses the auction component 11. The services provided by the auction component 11 of the web services may be in the form of a traditional, real-time, auction, delayed online auction, a reverse auction or otherwise. Where a reverse auction is used, the reverse auction may have a fixed-duration bidding, and multiple providers may compete for business.

In the present illustration, a web services provider 16 accesses the storage component 12, such as by using a web browser. In other embodiments, the web services provider 16 may use a client application which uses the standard protocols of TCP/IP to form a connection, and supplies the information that the web services provider 16 would otherwise provide through a web browser. The web services provider 16 may choose to use a client application to automate the process in such circumstances where the requirement for a human operator of the web browser may interfere or limit the activities in the electronic marketplace 10.

The web services provider 16 may provide to the storage component 12 the specifics and availability of particular web services. The web services provider 16 may also provide to the storage component 12 information regarding other elements related to the particular web services offered for auction. These elements may influence such things as the function of the web services, the value of the web services, and the availability of the web services. These quality of service (QoS) elements may include, but are not limited to, the volume of traffic which may be handled, the availability of the web services or accessibility to web sites, and the total quantity or volume of transactions done through the web services. Due to the underlying infrastructure and general unpredictability of the internet and HTTP based communication, it may be difficult to control actual bit transfer rates of information provided by the web services. As such, it may not be realistic to guarantee communication aspects of delivery, but instead to guarantee the quality of the information delivered by the web services. For this and other reasons, the term quality of service (QoS) as used herein may also refer to the quality of information returned from or by the web services, such as the precision of data, the timeliness of the data, and the accessibility of the data. For example, a web service providing stock market information may guarantee not more than a 5-second latency, a mapping service may guarantee a certain degree of precision of the maps and/or location services it provides, and another service may guarantee communication aspects such as a certain availability of the service or capacity to manage a certain volume of hits or requests.

The price offered by the auction component 11 for the web services may vary in response to the auction participants. The price may also vary in correlation to a quality of service for the web service. Thus, the web services provider 16 may offer one type of web service at several different prices, where the different pricing reflects, for example, the difference of the quality of service provided or promised by the provider for the web service. The web services provider 16 may offer the services with different sets of elements, adjusting the price to reflect the modification of value of the web services when taken with the particular set elements. Some elements may increase the value of the service, such as, for example, the capacity to handle large volumes of traffic. Other elements may decrease the perceived value of the services, such as when a provider offers a web service with no guaranteed response time.

Once the auction of a web service concludes, the storage component 12 may, for example, act to allow the web service to pass through from the web services provider 16 to the customer 14. FIG. 1 illustrates this by the dotted line which passes from the web services provider 16 through the storage component 12 and to the customer 14. By making use of the hyper-text transfer protocol (HTTP), the storage component 12 may serve as a proxy, receiving the request for service from the customer 14, and then in turn passing the request on the web services provider 16. When the storage component 12 receives the responses from the web services provider 16 for the request, the storage component 12 may pass the response on to the customer 14.

By use of this technique, the customer 14 need make little, if any, changes to the configuration of their web server to make use of the web services from different providers. In some embodiments, the customer 14 may obtain the web services directly from the web services provider 16 or 18 in other ways, which will readily suggest themselves to one skilled in the art.

In the case of reverse auctions where the web services provider 16 wins the auction, the customer 14 may continue to make requests of the storage component 12. In the present embodiment, the auction component 11 may notify the web service provider 16 and 18 of a new request for web services, such as via email, or otherwise. Alternatively, the customer 14 may select or identify, via the interface 15, web service providers 16 and 18 with applicable web services. The auction component 11 may make appropriate notifications on this basis as well.

The storage component 12 may measure the web service transactions between the customer 14 and the current web service provider, such as the web services provider 16 and the web services provider 18. The storage component 12 may record information including, but not limited to, the time for response to the requests for the web service, the number and frequency of requests for the web service, and other such elements as may be included with the quality of service offered through the web services quality of service exchange.

In another embodiment, the web services marketplace 10 is operable to offer web services such that customers 14 may purchase or enable directly from providers. For example, the web service provider 16 and a web service provider 18 notify the auction component 11 of one or more web services available to be provided. The auction component 11, in this embodiment, may use a standard transactional offer and acceptance format in lieu of an auction format. The web services provider 16 and the web services provider 18 may be a web services developers. The web services providers 16 and 18 may also be resellers of service for web services developers. While FIG. 1 only shows two web service providers 16 and 18, it should be understood that web services quality of service exchange may use any number of web service providers 16 and 18 marketing any number of web services.

The web services providers 16 and 18 may notify the auction component 11 of web services which they offer through the use of, for example, a web browser to access a web site interface 15 to the offering component 11. The web services provider 16 and 18 may notify the offering component 11 of a first combination of price, quantity and quality of service for each of the one or more web services offered, and of a second combination of price, quantity and quality of service for each of the one or more web services offered. The auction component 11 may allow the web services provider 16 and 18 to make each offering conditional such that acceptance of the first offer removes the second offer from the marketplace while acceptance of the second offer removes the first offer from the marketplace. The auction component 11 may allow the first offer and the second offer to remain separate and without condition, allowing each to function on the market independently. The auction component 11 may also allow a multiplicity of conditional offers from one or more of the web services provider 16 and 18. Such a multiplicity may optionally include nested conditional offers, such that acceptance of at least one or more such offer may remove or revise at least one or more other such offers from the same provider. This technique creates the possibility of greater efficiency and flexibility in the electronic marketplace 10, allowing, for example, the web services providers 16 and 18 to offer overlapping and different bundled packages of services without over committing the resources being offered as web services.

It should be understood that the customer 14 in the electronic marketplace 10 may represent a plurality of customers. In the present embodiment, the customer 14 may be, but is not limited to, a business with offerings to customers associated with the web services, a business desiring a utility associated with the web services, and an organization with the need for a particular web service.

The customer 14 may select a web service through the interface 15 of the auction component 11. The customer 14 may select the web service with the combination of identified traits that met the requirements of the customer 14. The identified traits may include but are not limited to price, quantity, and quality of service.

In one embodiment, the electronic marketplace 10 may include a financial component operable for the customer 14 to pay the web services provider of the services purchases, for example, the web services provider 16 and 18. In one embodiment, the financial components may generate the billing for the purchase of web services by customer 14 from providers such as the web services provider 16 and 18. In a different embodiment, the financial components may bill the customer 14 directly while providing the payment to the web services provider 16 and 18. In yet another embodiment, the financial components may provide only a record of the transaction between the customer 14 and the web services provider 16 and 18.

After purchasing the particular web service desired by the customer 14 from the auction component 11, the customer 14 may make use of the web service. In one embodiment, the web services provider 16 may provide the service to the customer 14 by directly coupling the customer 14 with the web services provider 16 shown as a dashed line 19. Such a coupling may take place using an HTTP access, and it may also take place by means of a socket connection using the TCP/IP standard to access a particular service to support the web services purchased by the customer 14.

Another example of a web service that may be offered and purchased via the electronic marketplace 10 is a computational service. The computation service may include a formula or analysis, such as, but not limited to, a proprietary algorithm, that requires heavy computation. The customer 14 of the web service may provide a variable or other input for the computation to the web service, and the web service, at a location and using resources of the web service provider, performs the calculation or calculations and returns the result of the computation to the customer 14. The web service provider 14 and customer 14 may agree on terms such as, the degree of precision or accuracy of the resulting computation, and the timeliness of the returning the computed result. The pricing may be based on, for example, the number of computations or a certain number over a given time interval.

Figure 2:
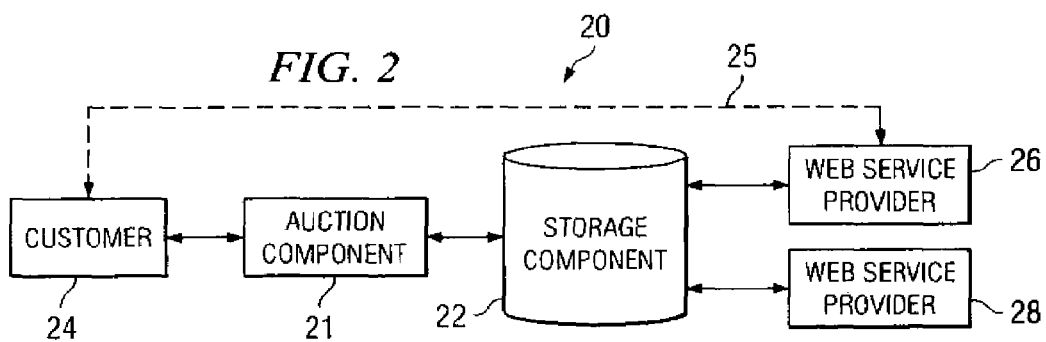
FIG. 2 is another embodiment of an electronic marketplace for web services by quality of service making use of a direct connection become a customer and a web service provider.

FIG. 2 illustrates a different embodiment of an electronic marketplace 20 for providing and marketing web services. The electronic marketplace 20 functions substantially the same as the electronic marketplace 10, with an auction component 21 corresponding to the auction component 11, a storage component 22 corresponding to the storage component 12, a customer 24 corresponding to the customer 14, and a web services provider 26 and 28 corresponding to the web services provider 16 and 18.

In the embodiment show in FIG. 2, the storage component 22 does not act to proxy transactions between the customer 24 and the web services provider 26. Instead, the customer 24 accesses the web services provider 26 directly, shown as a dashed line 25 connecting the customer 24 with the web services provider 26. The storage component 22 may provide information to direct the customer 24 to the web services provider 26. Such information may take the form of a Domain Name Service (DNS) record, a service known to those of skill in the art which correlates a particular name on the Internet with a particular Internet Protocol (IP) Address. The storage component 22 may provide a name for the web service auctioned, with the DNS records for the name constructed such that the name points to the IP Address of the winner of the auction. The customer 24 may use the name provided by the storage component 22, and this name would identify the winner of the auction such as, for example, web services provider 26.

Should the web services provider 28 win a subsequent auction for the same service for the customer 24, the storage component 22 may change the DNS records so that the name used by the customer 24 points to a different IP Address. This allows for the customer 24 to maintain the same configuration and while making use of the web services provider 28 instead of the web services provider 26. Such a format increases the efficiency of the electronic marketplace 20, reducing the amount of configuration work required to make use of the electronic marketplace 20.

Figure 3:
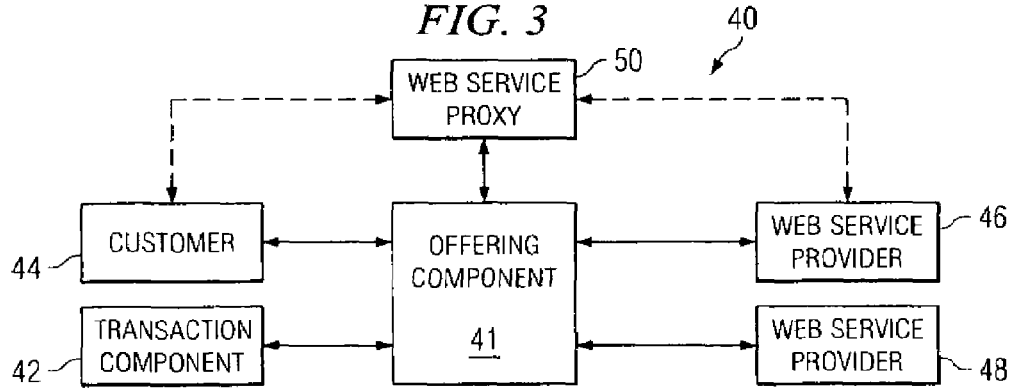
FIG. 3 is an embodiment of the web services marketplace for providing web services, making use of a proxy server.

FIG. 3 illustrates a different embodiment of the web services quality of service exchange provided as a web services marketplace 40. The web services marketplace 40 functions substantially the same as the electronic marketplace 10, with an offering component 41 corresponding and operating similar to the auction component 11, a transaction component 42 corresponding and operating similar to the storage component 12 and financial components discussed above, a customer 44 corresponding to the customer 14, and a web services provider 46 and 48 corresponding to the web services provider 16 and 18. In web services marketplace 40 the customer 44 couples to a web services proxy 50 after completing the purchase of a web service with the transaction component 42. The web services proxy 50 connects to the web services provider 46, and relays requests from the customer 44 to the web services provider 46, and then transmits the responses back to the customer 44.

The web services proxy 50 may measure the web service transactions between the customer 44 and the current web service provider such as the web services provider 46. The web services proxy 50 may record actual information, whether recorded real-time or provided by the web services provider 46, including, but not limited to, the time for responses to the requests for the web service, the number and frequency of requests for the web service, and other such elements as may be included with the quality of service offered through the web services quality of service exchange. In this manner the web services marketplace 40 may be operable in auditing capacity, may charge based on the transactions occurring between the customer 14 and the web services provider 46 and may provide a myriad of other functions for the benefit of both the current and future transactions between parties.

In some embodiments, license agreements may be provided for or associated with some or all of the web services provided on the above described systems. The license agreements may provide for the terms of use of the web service by the customer ultimately purchasing the web service and may include any obligations on the part of the web services provider. In some embodiments, the license agreements are uniform and standardized regardless of the web service, while in other embodiments, some of the license agreements are customized. This further commoditizes the web services and simplifies the transaction by eliminating protracted legal negotiations typically associated with obtaining such services.

While the techniques described in the embodiments of this invention refer to the use of web services, the techniques themselves do not depend directly on the use of HTTP or any particular web service. The techniques could just as easily apply to other Internet services which use and follow the TCP/IP standards. As a result, this disclosure contains sufficient information to allow one of skill in the art to apply an embodiment of this invention for use in conjunction with such existing and new Internet services as may be provided by a service provider separated from the customer computing systems, but which while separated may couple with the customer computing systems through an Internet connection using, for example, a socket connection following the TCP/IP standards.

While several embodiments have been provided in the present disclosure, it should be understood that the data loading tool may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be in communication with one another. Other examples of changes, substitutions, and alterations are readily ascertainable by on skilled in the art and could be made without departing from the spirit and scope disclosed herein.

What is claimed is:
1. A method for selling web services based on a quality of service, the method comprising:
  receiving, by at least one customer, a first set of offers from a plurality of providers for web services based on a quality of service for each of the web services, wherein the customer receives from at least one of the plurality of providers offers for one or more of the web services with multiple combinations of criteria including the quality of service;

obtaining, by the at least one customer, at least one of the web services having the quality of service for the at least one of the web services from a first of the providers;

using, by the at least one customer, the at least one of the web services through transactions with a proxy in accordance with a configuration, wherein the proxy communicates the transactions between the customer and the first of the providers and records information on the transactions corresponding to the quality of service for the at least one of the web services;

receiving, by the at least one customer, a second set of offers from a plurality of providers for web services based on the quality of service for each of the web services;

in response to the second set of offers, obtaining, by the at least one customer, the at least one of the web services from a second of the providers without change to the configuration; and subsequent to obtaining the at least one of the web services from the second of the providers, using, by the at least one customer, the at least one of the web services through transactions with the proxy in accordance with the configuration, wherein the proxy communicates the transactions between the customer and the second of the providers instead of communicating the transactions between the customer and the first of the providers.

2. The method of claim 1, wherein a first of the multiple combinations of criteria includes a first price based on a first quality of service of the one or more web services and a second of the multiple combinations of criteria includes a second price based on a second quality of service of the one or more web services.

3. The method of claim 1, wherein at least one web service is offered by one of the providers at an undetermined quality of service.

4. The method of claim 1, further comprising:
receiving, by the customer, a license agreement related to the use by the customer of the web service obtained from the provider.

5. The method of claim 1, wherein the web services are further defined as based on a Web Services standard.

6. The method of claim 1, wherein the web services are further defined as reusable components operable for providing a service via the Internet.

7. The method of claim 1, further comprising:
paying, by the at least one customer, the first of the providers for the at least one of the web services.

8. The method of claim 7, wherein the payment corresponds with the information recorded on the proxy.

9. The method of claim 1, wherein the second set of offers includes at least one offer from the first set of offers.

10. The method of claim 1, wherein obtaining, by the at least one customer, the at least one of the web services further includes purchasing the at least one of the web services.

11. The method of claim 10, wherein the at least one of the web services is purchased from an offering component in communication with the proxy.

12. The method of claim 1, wherein obtaining, by the at least one customer, the at least one of the web services further includes winning an auction for the at least one of the web services.

13. The method of claim 12, wherein the at least one of the web services is auctioned by an auctioning component in communication with the proxy.

14. The method of claim 1, wherein the at least one of the web services is obtained from the first of the providers by winning an auction and the at least one of the web services is obtained from the second of the providers by winning a subsequent auction.

15. The method of claim 1, wherein the at least one of the web services is obtained from the first of the providers by purchasing the at least one of the web services and the at least one of the web services is obtained from the second of the providers by purchasing the at least one of the web services.

16. An electronic marketplace system for selling web services, comprising:
an executable offering component stored on at least one computer and configured to identify a first set of offerings of a web service provided by a plurality of web services providers;
a customer computer in communication with the offering component configured to receive the first set of offerings and to obtain the web service from a first web service provider in accordance with one offering of the first set of offerings; and
an executable proxy stored on at least one computer and configured to receive requests from the customer computer and pass the requests to the first web service provider and further configured to receive replies from the first web service provider and pass the replies to the customer computer,
wherein the customer computer is further configured to:
use the web service with the first web service provider by sending the requests and receiving the replies with the proxy in accordance with a configuration; and
receive a second set of offerings of the web service provided by a plurality of web service providers and obtain the web service from a second web service provider in accordance with one offering of the second set of offerings without change to the configuration,
wherein upon the customer computer obtaining the web service from the second web service provider, the proxy is reconfigured to pass the requests to the second web service provider and receive replies from the second web service provider, and
wherein the customer computer is configured to use the web service with the second web service provider by sending the requests and receiving the replies with the proxy in accordance with the configuration upon reconfiguration of the proxy.

17. The web services marketplace of claim 16, wherein each of the plurality of web services providers provides a different offering for the web service.

18. The web services marketplace of claim 16, wherein one of the plurality of web services providers simultaneously provides multiple different offerings for the web service.

19. The web services marketplace of claim 16, wherein each of the offerings includes one or more criteria selected from the group comprising price, quality of service, and quantity.

20. The web services marketplace of claim 16, wherein the proxy records information on the requests and the replies passing through the proxy to use the web service.

21. The web services marketplace of claim 20, further comprising:
 a financial component configured to provide compensation to the one of the web service providers or the other of the web service providers based on the information recorded on the proxy.

22. The system of claim 16, wherein the second set of offerings includes at least one offer from the first set of offerings.

* * * * *